United States Patent
Crenshaw

[15] 3,678,076
[45] July 18, 1972

[54] TETRAHYDRODIBENZOTHIOPHENES

[72] Inventor: Ronnie R. Crenshaw, Dewitt, N.Y.

[73] Assignee: Bristol-Myers Company, New York, N.Y.

[22] Filed: Dec. 21, 1970

[21] Appl. No.: 100,422

Related U.S. Application Data

[63] Continuation-in-part of Ser. No. 825,923, May 19, 1969, abandoned.

[52] U.S. Cl. .................260/330.5, 260/326.84, 260/348 A, 260/470, 424/274, 424/275
[51] Int. Cl. .....................................A61k 27/00, C07d 63/24
[58] Field of Search................................................260/330.5

[56] References Cited

OTHER PUBLICATIONS

Hartough, et al., Compounds with Condensed Thiophene Rings, (Interscience, N.Y., 1954), Pages 272– 274.

Primary Examiner—Henry R. Jiles
Assistant Examiner—Cecilia M. Shurko
Attorney—Herbert W. Taylor, Jr., Robert E. Havranek, Richard H. Brink and James Magee, Jr.

[57] ABSTRACT dl-cis-4-Methyl-1,2,3,4-tetrahydrodibenzothiophene-3-carboxylic acids and derivatives thereof are compounds which exhibit antifertility activity and which are useful as oral antifertility agents in mammals. An example of a compound of the disclosure is sodium dl-cis-1,2,3,4-tetrahydro-7-methoxy-4-methyldibenzothiophene-3-carboxylate.

9 Claims, No Drawings

TETRAHYDRODIBENZOTHIOPHENES

CROSS-REFERENCE TO RELATED APPLICATIONS

This application is a continuation-in-part of a copending application, Ser. No. 825,923, filed May 19, 1969 and now abandoned.

BACKGROUND OF THE INVENTION

1. Field of the Invention

This invention relates to novel compounds. More particularly this invention relates to novel compounds which possess valuable utility as oral antifertility agents.

2. Description of the Prior Art

There exists a need to provide additional agents useful as antifertility agents and in particular nonsteroidal antifertility agents. Thus it is an object of this invention to provide novel nonsteroidal compounds having antifertility activity.

Compounds of the prior art most closely related to the compounds of the instant invention are found in the following literature:

A. G. Anner and K. Miescher, Helv. Chem. Acta, 29, 586 (1946) which describes the compounds having the formula

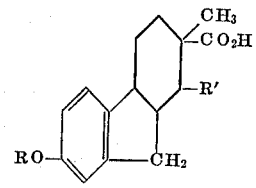

wherein R=H or $CH_3$ and R'=$CH_3$ or $C_2H_5$.

B. G. Anner and K. Miescher, ibid, 30, 544 (1947) which describes the compounds having the formula

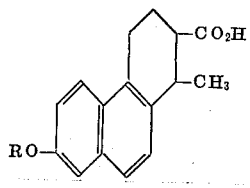

wherein R=H or $CH_3$.

C. J. Hogg, J. Am. Chem. Soc., 70, 161 (1948) which describes the compound having the formula

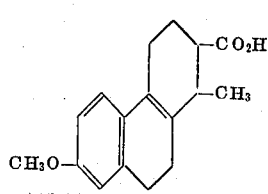

D. J. Hogg, ibid, 71, 1918 (1949) which describes the compound having the formula

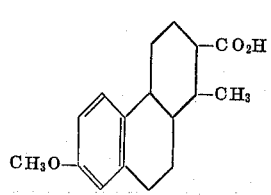

E. Synthetic Estrogens, J. Hogg & J. Korman, pp. 34–205, Medicinal Chemistry, Vol. II, John Wiley & Sons, Inc., (London), 1956 is a good general reference. All of the above acids (A, B, C & D) are congeners of the doisynolic acids which are potent estrogens;

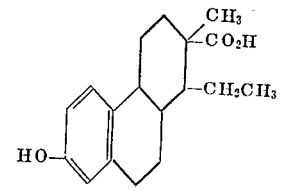

F. U. S. Pat. Nos. 3,344,147 and 2,582,253 describe the following compounds as antifertility agents or as synthetic estrogens;

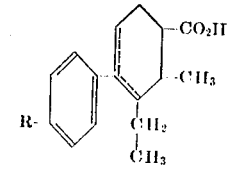

wherein R=H, OH or $OCH_3$.

SUMMARY OF THE INVENTION

The compounds of the present invention are the cis isomers of the compounds characterized as having the formula

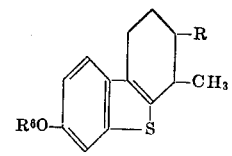

wherein $R^6$ is hydrogen, (lower)alkyl or (lower)alkanoyl; R is $-CO_2R^3$ or $-CH_2OR^4$ in which $R^3$ is hydrogen, (lower)alkyl or amino(lower)-alkyl and $R^4$ is hydrogen or (lower)alkanoyl; and a pharmaceutically acceptable salt thereof when $R^6$ or $R^3$ are hydrogen or amino(lower)-alkyl.

COMPLETE DISCLOSURE

The compounds of the present invention are the cis isomers of the compound characterized as having the formula

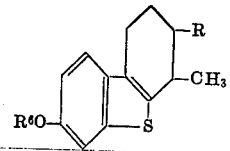

wherein $R^6$ is hydrogen, (lower)alkyl or (lower)alkanoyl; R is $-CO_2R^3$ or $-CH_2OR^4$ in which $R^3$ is hydrogen, (lower)alkyl or amino(lower)-alkyl, and $R^4$ is hydrogen or (lower)alkanoyl; and a pharmaceutically acceptable salt thereof when $R^6$ or $R^3$ are hydrogen or amino(lower)-alkyl.

The pharmaceutically acceptable salts are defined as the cationic salts of the carboxylic acid or phenol function including metallic cations such as sodium, potassium, calcium and aluminum and organic amine cations such as trialkylamines, e.g. triethylamine, procaine, dibenzylamine, N-benzyl-α-phenethylamine, 1-ephenamine, N,N'-dibenzylethylenediamine, dehydroabietylamine, N,N'-bis-dehydroabietylethylenediamine, N-(lower)alkylpiperidines, e.g. N-ethylpiperidine, and other amines which have been used to form salts of medicinally active acids.

Some of the compounds of the present invention are by definition capable of forming salts with acids due to their basic nitrogen functions. Pharmaceutically acceptable salts include the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, succinate, benzoate, tartrate, fumarate, malate, mandelate, ascorbate and the like.

The term "(lower)alkyl" as used herein means both straight and branched chain aliphatic hydrocarbon radicals having from one to 12 carbon atoms such as methyl, ethyl, propyl, isopropyl, butyl, isobutyl, t-butyl, amyl, hexyl, etc. Similarly, where the term "(lower)" is used as part of the description of another group, e.g. "amino-(lower)alkyl," it refers to the alkyl portion of such group which is therefore as described above in connection with "(lower)alkyl" and thus includes such radicals as aminomethyl, aminoethyl, aminopropyl, aminoisopropyl, etc.

A preferred embodiment of the present invention is the cis isomers of the compound having the formula

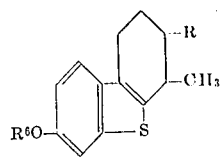

wherein $R^6$ is hydrogen, (lower)alkyl or (lower)alkanoyl; R is $-CO_2R^3$ or $-CH_2OR^4$ in which $R^3$ is hydrogen, (lower)alkyl or amino(lower)-alkyl and $R^4$ is hydrogen or (lower)alkanoyl; and a pharmaceutically acceptable salt thereof when $R^6$ or $R^3$ are hydrogen or amino(lower)-alkyl.

A more preferred embodiment of the present invention is the cis isomers of the compound having the formula

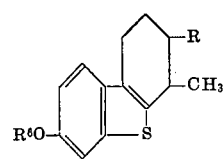

wherein $R^6$ is hydrogen, (lower)alkyl or (lower)alkanoyl; R is $-CO_2R^3$ or $-CH_2OR^4$ in which $R^3$ is hydrogen or (lower)alkyl and $R^4$ is hydrogen; or a pharmaceutically acceptable salt thereof when $R^3$ or $R^6$ is hydrogen.

Another preferred embodiment is the cis isomers of the compound having the formula

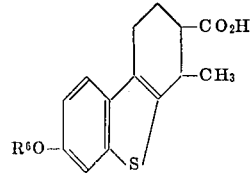

in which $R^6$ is hydrogen, (lower)alkyl or (lower)alkanoyl; or a pharmaceutically acceptable salt thereof.

Still another preferred embodiment is the cis isomers of the compound having the formula

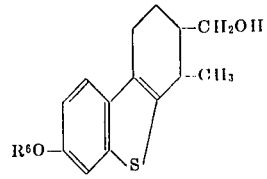

in which $R^6$ is hydrogen, (lower)alkyl or (lower)alkanoyl; or a pharmaceutically acceptable salt thereof when $R^6$ is hydrogen.

Still another preferred embodiment is the cis isomers of the compound having the formula

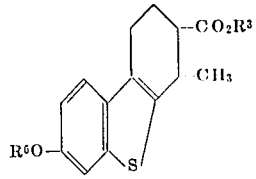

in which $R^6$ is hydrogen, (lower)alkyl or (lower)alkanoyl, and $R^3$ is (lower)alkyl; or a pharmaceutically acceptable salt when $R^6$ is hydrogen.

Most preferred embodiments are the compounds having the names:
1. dl-cis 3-Hydroxymethyl-7-hydroxy-4-methyl-1,2,3,4-tetrahydrodibenzothiophene.
2. dl-cis 7-Acetoxy-4-methyl-1,2,3,4-tetrahydrodibenzothiophene-3-carboxylic acid.
3. dl-cis 7-methoxy-4-methyl-1,2,3,4-tetrahydrodibenzothiophene-3-carboxylic acid.
4. dl-cis Ethyl-7-hydroxy-4-methyl-1,2,3,4-tetrahydrodibenzothiophene-3-carboxylate.

The compounds of the instant invention have the formula

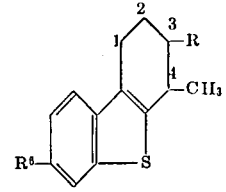

As the compound has two asymetric carbons at positions 3 and 4, it is possible for the compound to exist as one pair of cis isomers and one pair of trans isomers. Since the cis isomers are more potent antifertility agents than the trans isomers, only the cis isomers are claimed herein. The compounds named "dl-cis" are a racemic mixture of the dextro (d) and levo (l) rotatory isomers. Both cis isomers and mixtures thereof are considered an integral part of this invention.

The cis isomers are formed by catalytic reduction of the $C_3$–$C_4$ double bond as illustrated in examples 1D and 2C.

The compounds of the instant invention are prepared by the general reaction scheme:

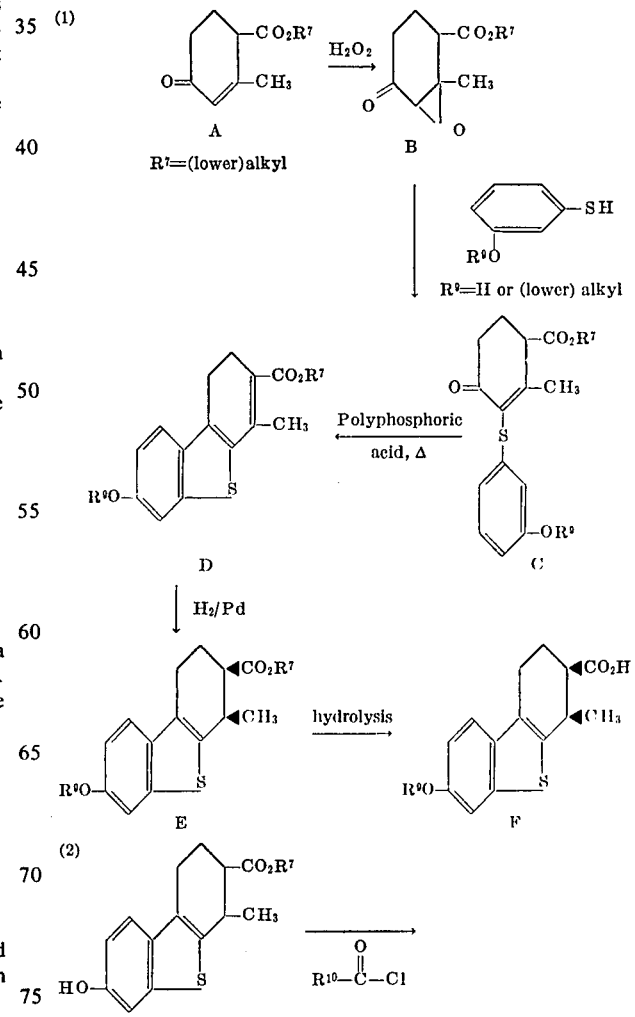

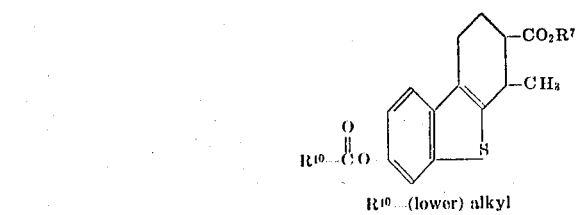

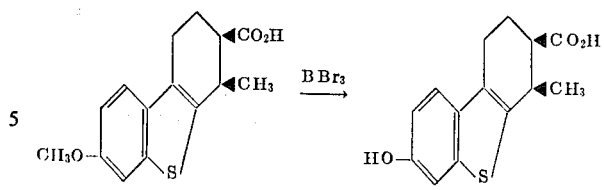

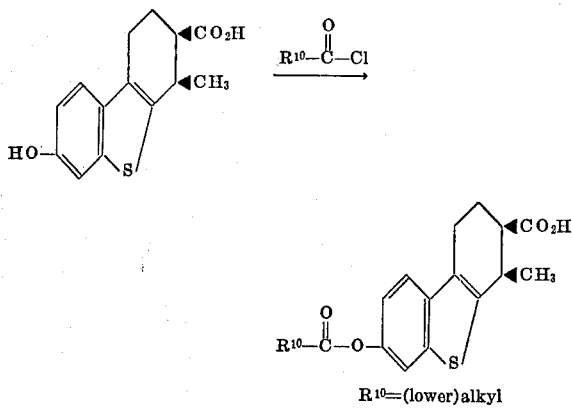

The above illustrated reactions and the examples herein are representative of those general reactions known to occur in this series of compounds. These reactions are applicable to the preparation of all the compounds claimed herein.

The compounds claimed herein possess antifertility activity. The compounds of the instant invention are nonsteroidal agents that exhibit antifertility activity and are useful as oral antifertility agents in mammals. They are useful in controlling the rodent population e.g., mice, rats, etc.

The compounds of the instant invention were tested on mice and sometimes on rats, in the following manner:

The adult female animals were segregated from the males for several months prior to testing to insure that no females were pregnant prior to the start of testing the specific antifertility compound.

Starting with the first day, a single dose was administered each day for three days, following which the female was placed in a cage containing a virile adult male. The female was dosed for six of the next seven days. Three days after completion of the dosing the female was sacrificed and autopsied. The uterus was carefully examined for embryo and/or implantation sites. The absence of implantation sites in the uterus indicated the pregnancy was completely inhibited.

When the example, the compound 7-acetoxy-4-methyl-1,2,3,4-tetrahydrodibenzothiophene-3-carboxylic acid was administered orally to mice at doses as low as 4 mg./kg./day, no implantation sites were observed in any of the mice tested. In rats, doses as low as 1 mg./kg./day were adequate to prevent pregnancy. Minimum Effective Dosages (MED) for other compounds of the invention are reported in the Experimental section.

The compounds of the invention may be administered as the free base, acid, or in the form of their nontoxic salts. The compounds of this invention may be compounded and formulated into pharmaceutical preparations in unit dosage form for oral administration with organic or inorganic solid materials or liquids which are pharmaceutically acceptable carriers. The compositions may take the form of tablets, powder granules, capsules, suspensions, solutions and the like. Such compositions are considered within the scope of this invention.

The compounds of this invention when administered orally, in an effective amount, are effective in the inhibition of pregnancy in mammals. The usual daily dosage is from about 0.5 to 200 mgm./kg.

For the control of rodents the compounds of this invention are conveniently mixed with rodent feed. Thus the compounds are administered to the rodent orally with the feed. A daily dosage of from about 0.5 to 200 mgm./kg. is effective in inhibiting pregnancy and thereby controlling the rodent population.

The following examples are intended to illustrate the invention described herein without unduly restricting it.

DESCRIPTION OF THE PREFERRED EMBODIMENTS

EXAMPLE 1

Preparation of dl-cis Sodium 7-methoxy-4-methyl-1,2,3,4-tetrahydrodibenzothiophene-3-carboxylate:

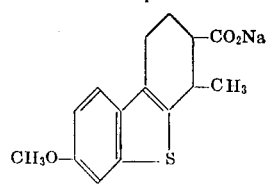

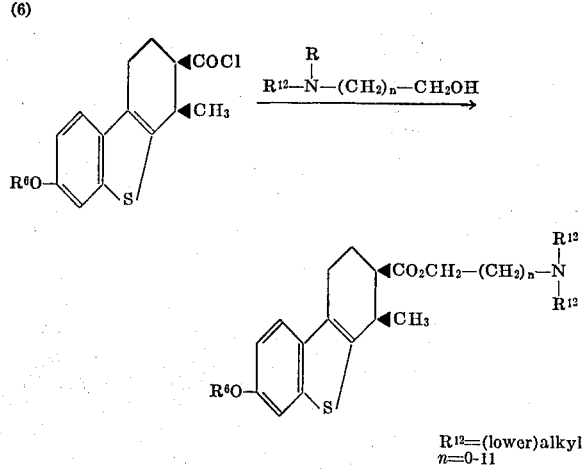

A. Ethyl 2,3-epoxy-4-keto-2-methylcyclohexanecarboxylate:

A cold solution of aqueous 8 molar hydrogen peroxide (13.7 ml., 0.11 mole) in aqueous 4 N sodium hydroxide (27.3 ml., 0.11 mole) was added over an 8 minute period to a solution of ethyl 2-methyl-4-oxocyclohex-2-enecarboxylate [Smith and Rousault, J. Am. Chem. Soc., 65, 631 (1942)] (20.0 grams, 0.11 mole) in methanol (215 ml.) at 0° C. An exothermic reaction (10° C.) occurred during the addition.

The mixture was stirred an additional 40 minutes at 0° C. and then, after dilution with a mixture of ice (75 g.) and saturated brine solution (90 grams), was extracted with chloroform (3 × 100 ml.). The chloroform extracts were washed with a minimum of water, and then were dried and evaporated to leave the product (17.5 grams, 81 percent). Distillation gave 13.6 grams (63 percent), b.p. 82° C.–85° C./0.05 mm. (A small amount of the methyl ester was present owing exchange with the solvent).

Anal. calc'd. for $C_{10}H_{14}O_4$: C, 60.60; H, 7.12.
Found: C, 60.72; H, 7.27.

B. Ethyl 3-(m-methoxyphenylthio)-2-methyl-4-ketocyclohex-2-enecarboxylate:

A solution of m-methoxythiophenol [G. Perold and P. van Lengen, Berichte, 92, 296 (1959)] (2.91 grams, 0.0208 mole) and ethyl 2,3-epoxy-4-keto-2-methylcyclohexanecarboxylate (4.11 grams, 0.0208 mole) in dimethylformamide (46 ml.) was refluxed under a nitrogen atmosphere for 3.5 hours. The solvent was removed and the product was collected by distillation at 174° C.–182° C./0.05 mm. (3.26 grams). The material was purified further by chromatography on acid-washed alumina (elution with toluene) to give the title compound as a yellow oil.

Anal. calc'd. for $C_{17}H_{20}O_4S$: C, 63.73; H, 6.29; S, 10.01.
Found: C, 63.62; H, 6.36; S, 10.22.

C. Ethyl 1,2-dihydro-7-methoxy-4-methyldibenzothiophene-3-carboxylate:

A solution of the keto ester prepared in B above (14.5 grams) in polyphosphoric acid (140 grams) was stirred under nitrogen at 55° C.–60° C. for 25 minutes. The mixture then was poured onto ice, and after thorough mixing, was extracted with ether. The ether extracts were washed with water, dried and evaporated to leave a semi-crystalline product. Three recrystallizations from acetonitrile gave the title compound as yellow plates, m.p. 122° C.–122.5° C.

Anal. calc'd. for $C_{17}H_{18}O_3S$: C, 67.52; H, 6.00; S, 10.61.
Found: C, 67.39; H, 6.02; S, 10.60.

D. dl-cis Ethyl 7-methoxy-4-methyl-1,2,3,4-tetrahydrodibenzothiophene-3-carboxylate:

A solution of the cyclic ester prepared in C above (18.8 grams) in ethyl acetate (300 ml.) containing 10 percent palladium on carbon was shaken under 50 psi hydrogen for two days. The catalyst was separated and the solvent was removed to leave a solid which was recrystallized from ethanol to give the title compound as white plates, m.p. 103.5° C.–105° C.

Anal. calc'd. for $C_{17}H_{20}O_3S$: C, 67.07; H, 6.62; S, 10.53.
Found: C, 66.85; H, 6.62; S, 10.86.

E. dl-cis Sodium 7-methoxy-4-methyl-1,2,3,4-tetrahydrodibenzothiophene-3-carboxylate:

A mixture of the ester prepared in D above (5.00 grams), ethanol (27 ml.) and water (5.5 ml.) containing potassium hydroxide (1.20 grams) was heated under reflux for 18 hours. The resultant solution was acidified and the precipitated acid was extracted into chloroform. The chloroform solution was washed with water, dried and evaporated to leave the free acid of the title compound, m.p. 227° C.–232° C.; recrystallized from ethanol to give white needles, m.p. 233.5° C.–235° C.

Anal. calc'd. for $C_{15}H_{16}O_3S$: C, 65.19; H, 5.84; S, 11.60.
Found: C, 64.94; H, 6.06; S, 11.64.

MED in rats: 3 mg./kg./day.

The sodium salt was formed by dissolution of 1.47 grams of the acid in 53 ml. of aqueous 0.1 N sodium hydroxide, followed by lyophilization.

EXAMPLE 2

Preparation of 7-hydroxy-4-methyl-1,2,3,4-tetrahydrodibenzothiophene-3-carboxylic acid.

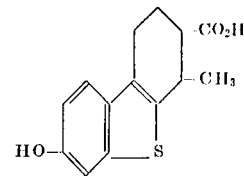

A. Ethyl 3-(m-hydroxyphenylthio)-2-methyl-4-oxocyclohex-2-enecarboxylate:

A solution of m-hydroxyphenylthiophenol (6.00 grams) and ethyl 2,3-epoxy-4-keto-2-methylcyclohexanecarboxylate (9.43 grams) in dimethylformamide (60 ml.) was refluxed under a nitrogen atmosphere for 4 hours, then was stirred at 25° for 12 hours. The solvent was removed under reduced pressure and the residue was dissolved in ether. The ether solution was washed with aqueous sodium carbonate and then with water. Drying and evaporation of the solvent left a residue which was heated at 180° C./0.1 mm. for removal of volatile by-products. Recrystallization (benzene) gave m.p. 104° C.–107° C.

Anal. calc'd. for $C_{16}H_{18}O_4S$: C, 62.72; H, 5.92; S, 10.47.
Found: C, 62.59; H, 5.90; S, 10.66.

B. Ethyl 1,2-dihydro-7-hydroxy-4-methyldibenzothiophene-3-carboxylate:

The above keto ester prepared in A above was cyclized in polyphosphoric acid at 41–44° C. for 20 minutes. The product was isolated as described in Example 1, part C; m.p. 151° C.–154.5° C.

Anal. calc'd. for $C_{16}H_{16}O_3S$: C, 66.65; H, 5.59; S, 11.12.
Found: C, 65.93; H, 5.51; S, 11.45.

C. dl-cis-Ethyl 7-hydroxy-4-methyl-1,2,3,4-tetrahydrodibenzothiophene-3-carboxylate:

The ester prepared in B above was hydrogenated in ethanol containing 10 percent palladium on carbon. The product was recrystallized from ethanol; m.p. 141° C.–142.5° C.

Anal. calc'd. for $C_{16}H_{18}O_3S$: C, 66.18; H, 6.25; S, 11.04.
Found: C, 66.79; H, 6.40; S, 11.30.

MED in rats: 3 mg./kg./day.

D. dl-cis-7-Hydroxy-4-methyl-1,2,3,4-tetrahydrodibenzothiophene-3-carboxylic acid:

The ethyl ester prepared in C above was hydrolyzed in water and ethanol containing potassium hydroxide in a manner similar to that described in Example 1, part E, to produce the title compound, m.p. 211° C.–213° C.

Anal. calc'd. for $C_{14}H_{14}O_3S$: C, 64.10, H, 5.38; S, 12.22.
Found: C, 64.06; H, 5.69; S, 12.24.

EXAMPLE 3

Sodium 7-Hydroxy-4-methyl-1,2,3,4-tetrahydrodibenzothiophene-3-carboxylate:

Boron tribromide (2.0 ml.) in methylene chloride (33 ml.) was added to a suspension of dl-cis-1,2,3,4-tetrahydro-7-methoxy-4-methyldibenzothiophene-3-carboxylic acid (2.8 grams) in methylene chloride (85 ml.) at −50° C. The cooling bath was removed and the mixture was stirred at 21° C. for forty minutes.

The mixture then was decomposed with ice and the product was separated by filtration. Recrystallization (acetonitrile) gave 1.43 grams, m.p. 211° C.–213° C., of the free acid of the title compound.

Anal. calc'd. for $C_{14}H_{14}O_3S$: C, 64.10; H, 5.38; S, 12.22.
Found: C, 64.06; H, 5.69; S, 12.24.

The sodium salt was formed by dissolution in aqueous 0.1 N sodium hydroxide followed by lyophilization. MED in mice: 50–75 mg./kg./day; in rats: 8 mg./kg./day.

EXAMPLE 4

1,2-Dihydro-7-hydroxy-4-methyldibenzothiophene-3-carboxylic acid:

1,2-Dihydro-7-methoxy-4-methyldibenzothiophene-3-carboxylic acid was demethylated using boron tribromide following the general procedure as in Example 3. The title acid was obtained as yellow plates (recrystallization from ethanol), m.p. 182° C.-185° C.

Anal. calc'd. for $C_{14}H_{12}O_3S$: C, 64.60; H, 4.65; S, 12.32.
    Found: C, 64.69; H, 4.87; S, 12.32.

EXAMPLE 5 dl-cis 2-N,N-Diethylaminoethyl-7-methoxy-4-methyl-1,2,3,4-tetrahydrodibenzothiophene-3-carboxylate hydrochloride:

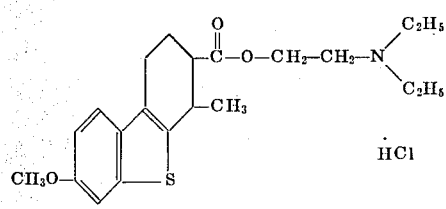

A mixture of dl-cis 7-methoxy-4-methyl-1,2,3,4-tetrahydrodibenzothiophene-3-carboxylic acid (3.7 grams) and thionyl chloride (20 ml.) was heated under reflux for 40 minutes. The excess thionyl chloride was removed and the residual acid chloride was treated with N,N-diethylaminoethanol (20 ml.). The mixture was heated at 80° C. for 1 hour, and then the excess amino-alcohol was removed by distillation. An ethereal solution of the residue was washed in succession with dilute aqueous sodium hydroxide and water, and then was extracted thrice with aqueous 1N hydrochloric acid. The product was extracted from the combined acid extracts with chloroform. Evaporation of the chloroform left a semi-solid (5.2 grams) which was triturated under acetone to yield crystalline solid (2.2 grams), m.p. 192° C.-195° C. Recrystallization (acetonitrile) gave m.p. 193° C.-195° C.

Anal. calc'd. for $C_{21}H_{29}NO_3S \cdot HCl$: C, 61.21; H, 7.34; N, 3.40.
    Found: C, 60.92; H, 7.03; N, 3.15.
MED in mice: 20 mg./kg./day.

EXAMPLE 6 dl-cis-7-Cyclopentyloxy-4-methyl-1,2,3,4-tetrahydrodibenzothiophene-3-carboxylic acid.

A solution of dl-cis-7-hydroxy-4-methyl-1,2,3,4-tetrahydrobenzothiophene-3-carboxylic acid (2.00 grams) in dimethylformamide (15 ml.) was added with ice cooling to 0.65 grams of sodium hydride (56.6 percent dispersion in mineral oil). The mixture was heated at 70° C. for 30 minutes, and then cyclopentyl bromide (1.14 grams) in dimethylformamide (5 ml.) was added.

The mixture was heated at 72° C. for 12 hours, and then was poured onto ice. After acidification, the aqueous mixture was extracted with ether. The ether was washed several times with water and then was dried and evaporated. The resultant solid was recrystallized three times from ethanol to give white needles, m.p. 201° C.-202.5° C.

Anal. calc'd. for $C_{19}H_{22}O_3S$: C, 69.06; H, 6.71; S, 9.70.
    Found: C, 68.75; H, 7.04; S, 9.61.
MED in mice: 20 mg./kg./day.

EXAMPLE 7 dl-cis-Methyl 7-cyclopentyloxy-4-methyl-1,2,3,4-tetrahydrodibenzothiophene-3-carboxylate:

A sample of the above acid of Example 6 was converted to the methyl ester by treatment with diazomethane. Recrystallization from methanol gave white plates, m.p. 118° C.-119.5° C.

Anal. calc'd. for $C_{20}H_{24}O_3S$: C, 69.72; H, 7.02.
    Found: C, 69.99; H, 7.24.
MED in mice: 20 mg./kg./day.

EXAMPLE 8 dl-cis-7-Acetoxy-4-methyl-1,2,3,4-tetrahydrodibenzothiophene-3-carboxylic acid:

A solution of dl-cis-7-hydroxy-4-methyl-1,2,3,4-tetrahydrodibenzothiophene-3-carboxylic acid (836 mg.) in pyridine (25 ml.) and acetic anhydride (1.2 ml.) was stirred at 25° C. for 24 hours. The mixture was poured onto ice and then was extracted with ether. Evaporation of the ether gave a residue which was triturated under water to yield crystalline solid (850 mg.). Recrystallization (toluene) gave m.p. 213° C.-215<$v$ C.

Anal. calc'd. for $C_{16}H_{16}O_4S$: C, 63.14; H, 5.30.
    Found: C, 63.03; H, 5.55. MED in mice: 4 mg./kg./day; in rats: 1 mg./kg./day.

EXAMPLE 9 dl-cis-3-Hydroxymethyl-7-Methoxy-4-methyl-1,2,3,4-tetrahydrodibenzothiophene:

A solution of dl-cis-ethyl 7-methoxy-4-methyl-1,2,3,4-tetrahydrodibenzothiophene-3-carboxylate (20.00 grams) in ether (800 ml.) was added over 1.5 hours to lithium aluminum hydride (2.50 grams) in ether (200 ml.). The mixture was refluxed for an additional 2.5 hours, and then was cooled and treated with aqueous sodium hydroxide. The ether layer was separated and evaporated to yield the product (14.17 grams, m.p. 128° C.-131° C.) Recrystallization (acetonitrile) gave m.p. 132.5° C.-134.5° C.

Anal. calc'd. for $C_{15}H_{18}O_2S$: C, 68.67; H, 6.92; S, 12.22.
    Found: C, 68.75; H, 7.01; S, 12.31.
MED in mice: 20 mg./kg./day.

EXAMPLE 10 dl-cis-3-Hydroxymethyl-7-hydroxy-4-methyl-1,2,3,4-tetrahydrodibenzothiophene:

A solution of boron tribromide (15.25 grams) in methylene chloride (60 ml.) was added to a solution at −25° C. of dl-cis-3-hydroxymethyl-7-methoxy-4-methyl-1,2,3,4-tetrahydrodibenzothiophene (8.00 grams) in methylene chloride (250 ml.). The solution was warmed to room temperature and then was poured onto ice. The solid product was collected by filtration (5.85 grams; m.p. 169°-180° C.). Trituration under acetonitrile followed by recrystallization from aqueous methanol gave m.p. 183° C.-186.5° C.

Anal. calc'd. for $C_{14}H_{16}O_2S$: C, 67.72; H, 6.50; S, 12.91.
    Found: C, 68.05; H, 6.82; D, 12.85.
MED in mice: 4 mg./kg./day.

EXAMPLE 11 dl-cis-3-Acetoxymethyl-7-methoxy-4-methyl-1,2,3,4-tetrahydrodibenzothiophene:

Acetic anhydride (1.87 grams) was added to a solution of dl-cis-3-hydroxymethyl-7-methoxy-4-methyl-1,2,3,4-tetrahydrodibenzothiophene (1.20 grams) in pyridine (40 ml.) at 5° C. The resultant solution was warmed to 80° C. over a 2 hour period and then, after cooling, the solution was poured onto ice. Extraction with chloroform yielded 1.40 grams crystalline solid, m.p. 113° C.-115.5° C. Recrystallization (acetonitrile) gave m.p. 114° C.-116° C.

Anal. calc'd. for $C_{17}H_{20}O_3S$: C, 67.08; H, 6.62; S, 10.53.
    Found: C, 66.81; H, 6.72; S, 10.78.
MED in mice: 20 mg./kg./day.

EXAMPLE 12 dl-cis-7-Acetoxy-3-acetoxymethyl-4-methyl-1,2,3,4-tetrahydrodibenzothiophene:

Using the procedure described in Example 11, dl-cis-3-hydroxy-methyl-7-hydroxy-4-methyl-1,2,3,4-tetrahydrodibenzothiophene (1.00 gram) was converted with excess acetic anhydride (3.24 grams) to its diacetate derivative; m.p. 73° C.–75° C.

Anal calc'd. for $C_{18}H_{20}O_4S$: C, 65.04; H, 6.06; S, 9.65.
Found: C, 64.66; H, 6.24; S,
MED in mice: 20 mg./kg./day.

EXAMPLE 13 dl-cis-3-Acetoxymethyl-7-hydroxy-4-methyl-1,2,3,4-tetrahydrodibenzothiophene:

Preferential hydrolysis of dl-cis-7-acetoxy-3-acetoxymethyl-4-methyl-1,2,3,4-tetrahydrodibenzothiophene with aqueous sodium hydroxide yields the title monoacetyl derivative.

EXAMPLE 14 dl-cis-7-Acetoxy-3-hydroxymethyl-4-methyl-1,2,3,4-tetrahydrodibenzothiophene:

Using the same procedure described in Example 17, dl-cis-3-hydroxymethyl-7-hydroxy-4-methyl-1,2,3,4-dibenzothiophene (1.00 gram) was converted with one equivalent of acetic anhydride (0.41 gram) to its 7-acetyl derivative; the product was obtained as a yellow oil which was recrystallized from ethanol; m.p. 80°–83° C.

MED in mice: 4 mg./kg./day.

EXAMPLE 15

Preparation of dl-cis-Ethyl-7-acetoxy-4-methyl-1,2,3,4-tetrahydrodibenzothiophene-3-carboxylate:

dl-cis-Ethyl-7-hydroxy-4-methyl-1,2,3,4-tetrahydrodibenzothiophene-3-carboxylate (2 grams) is treated with an equimolar quantity of acetyl chloride in pyridine with the aid of heat to produce the title compound.

EXAMPLE 16 dl-cis-7-Enanthyloxy-4-methyl-1,2,3,4-tetrahydrodibenzothiophene-3-carboxylic acid:

dl-cis-7-Hydroxy-4-methyl-1,2,3,4-tetrahydrodibenzothiophene-3-carboxylic acid (3.00 g.) in dimethylformamide (30 ml.) containing sodium hydride dispersion (2 equivalents) was acylated with heptanoyl chloride (1.70 g.) to yield the title compound; m.p. 172.5°–175° C.

MED in mice: 4 mg./kg./day.

EXAMPLE 17 dl-cis 2-N-Pyrrolidylethyl-7-methoxy-4-methyl-1,2,3,4-tetrahydrodibenzothiophene-3-carboxylate hydrochloride:

A solution of sodium 7-methoxy-4-methyl-1,2,3,4-tetrahydrodibenzothiophene-3-carboxylate (2.30 g.) and N-(2-chloroethyl)pyrrolidine (1.43 g.) heated at 70° in dimethylformamide (40 ml.) yielded the amino-alkyl ester. Treatment with one equivalent of 0.1 N HCl gave the title hydrochloride salt; m.p. 178°–184° C.

MED in mice: 4 mg./kg./day.

I claim:
1. The cis isomer of a compound having the formula

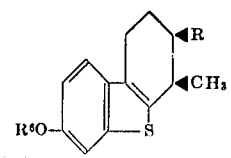

wherein $R^6$ is hydrogen, (lower)alkyl or (lower)alkanoyl; R is $-CO_2R^3$ or $-CH_2OR^4$ in which $R^3$ is hydrogen, (lower)alkyl or di(lower)alkylamino(lower)alkyl and $R^4$ is hydrogen or (lower)alkanoyl; and a pharmaceutically acceptable salt thereof when $R^6$ or $R^3$ are hydrogen or amino(lower)alkyl.

2. The cis isomer of a compound having the formula

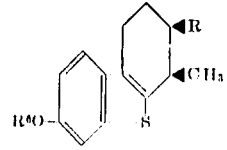

wherein $R^6$ is hydrogen, (lower)alkyl or (lower)alkanoyl; R is $-CO_2R^3$ or $-CH_2OR^4$ in which $R^3$ is hydrogen or (lower)alkyl and $R^4$ is hydrogen; or a pharmaceutically acceptable salt thereof when $R^3$ or $R^6$ is hydrogen.

3. A compound of claim 2 having the formula

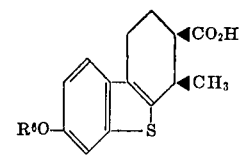

in which $R^6$ is hydrogen, (lower)alkyl or (lower)alkanoyl; or a pharmaceutically acceptable salt thereof.

4. A compound of claim 2 having the formula

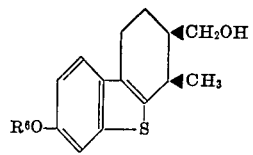

in which $R^6$ is hydrogen, (lower)alkyl or (lower)alkanoyl; or a pharmaceutically acceptable salt thereof when $R^6$ is hydrogen.

5. A compound of claim 2 having the formula

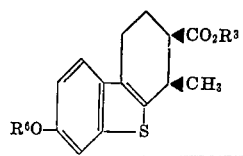

in which $R^6$ is hydrogen, (lower)alkyl or (lower)alkanoyl, and $R^3$ is (lower)alkyl; or a pharmaceutically acceptable salt when $R^6$ is hydrogen.

6. dl-cis-3-Hydroxymethyl-7-hydroxy-4-methyl-1,2,3,4-tetrahydrodibenzothiophene; or a pharmaceutically acceptable salt thereof.

7. dl-cis 7-Acetoxy-4-methyl-1,2,3,4-tetrahydrodibenzothiophene-3-carboxylic acid; or a pharmaceutically acceptable salt thereof.

8. dl-cis Ethyl-7-hydroxy-4-methyl-1,2,3,4-tetrahydrodibenzothiophene-3-carboxylate; or a pharmaceutically acceptable salt thereof.

9. dl-cis 7-Methoxy-4-methyl-1,2,3,4-tetrahydrodibenzothiophene-3-carboxylic acid; or a pharmaceutically acceptable salt thereof.

* * * * *